(12) United States Patent
North et al.

(10) Patent No.: US 7,963,528 B2
(45) Date of Patent: Jun. 21, 2011

(54) WORKING MACHINE

(75) Inventors: Alexander North, Loughborough (GB); Kevin W. Ford, Stoke-on-Trent (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 321 days.

(21) Appl. No.: 12/175,152

(22) Filed: Jul. 17, 2008

(65) Prior Publication Data

US 2009/0020965 A1    Jan. 22, 2009

(30) Foreign Application Priority Data

Jul. 21, 2007 (GB) .................................. 0714382.9

(51) Int. Cl.
*B60G 17/02* (2006.01)
(52) U.S. Cl. ..................... 280/5.515; 414/685
(58) Field of Classification Search .................. 280/5.5, 280/5.508, 5.512, 5.514, 5.515, 5.518, 5.519; 414/685, 699
See application file for complete search history.

(56) References Cited

U.S. PATENT DOCUMENTS

| | | | |
|---|---|---|---|
| 4,264,014 A | 4/1981 | Hogg et al. | |
| 5,013,061 A | 5/1991 | Fujimura et al. | |
| 5,104,143 A * | 4/1992 | Yonekawa | 280/5.506 |
| 5,116,077 A | 5/1992 | Karnopp et al. | |
| 5,388,857 A | 2/1995 | Wernimont et al. | |
| 6,144,907 A | 11/2000 | Shibuya et al. | |
| 6,802,687 B2 * | 10/2004 | Litchfield et al. | 414/699 |
| 7,383,906 B2 * | 6/2008 | Sewell | 180/89.13 |
| 2002/0001516 A1 * | 1/2002 | Cook et al. | 414/685 |
| 2004/0120800 A1 * | 6/2004 | Litchfield et al. | 414/699 |
| 2007/0059146 A1 * | 3/2007 | Bitter | 414/685 |

FOREIGN PATENT DOCUMENTS

| | | |
|---|---|---|
| EP | 0 885 756 B1 | 8/2002 |
| EP | 0 893 290 B1 | 12/2002 |
| EP | 0 919 407 B1 | 1/2004 |
| EP | 1 437 324 | 7/2004 |
| FR | 2 821 295 | 9/2003 |
| GB | 1 238 243 | 7/1971 |
| GB | 1 470 500 | 4/1977 |

OTHER PUBLICATIONS

UK Search Report for GB0813048.6, dated Oct. 27, 2008.
Search Report for EP 08 16 0565, dated Apr. 15, 2010.

* cited by examiner

*Primary Examiner* — Paul N Dickson
*Assistant Examiner* — Robert A Coker
(74) *Attorney, Agent, or Firm* — Marshall, Gerstein & Borun LLP

(57) ABSTRACT

A working machine includes a body and an axle which is mounted so as to be moveable relative to the body, the axle carrying at or towards each end, a ground engaging wheel by means of which the machine can travel over the ground, the machine including a speed sensor sensitive to the machine ground speed, and there being a hydraulic control system including at least one control actuator connected between the body and the axle for controlling movement of the axle relative to the body, and the hydraulic system further including at least one control valve which is operable to restrict fluid flow occurring as a result of the control actuator extending or retracting in response to axle movements relative to the body, depending upon the signal provided by the speed sensor, wherein the control valve is an electrically operated control valve, operated proportionally by a valve controller which responds to changes in machine speed, by adjusting the restriction to fluid flow so as to permit more fluid flow as the machine speed increases.

25 Claims, 3 Drawing Sheets

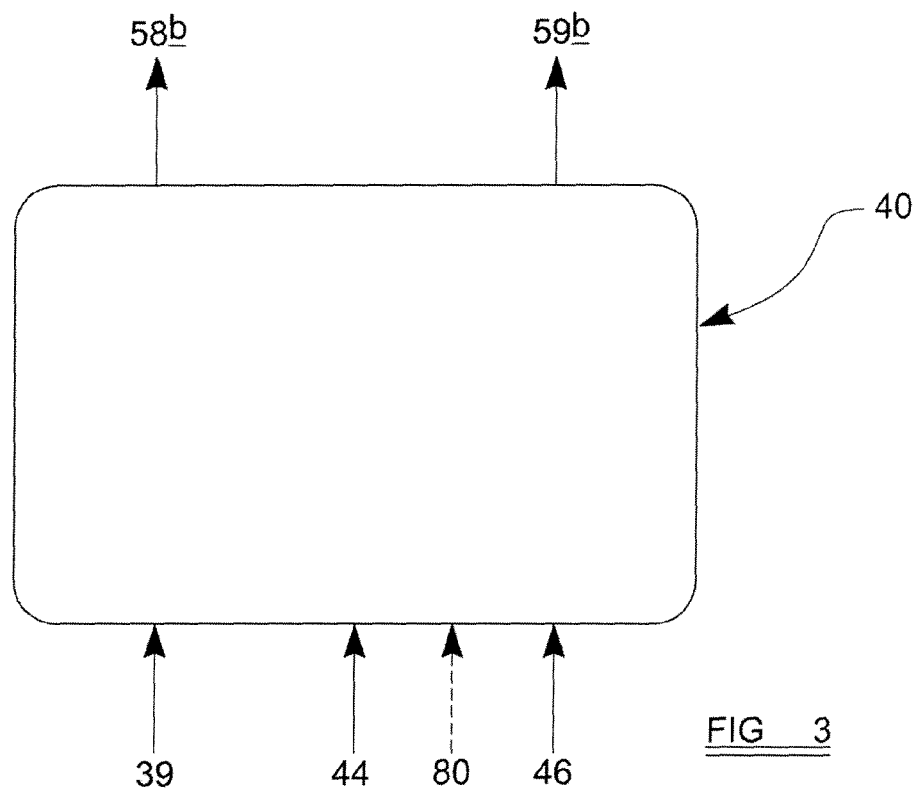
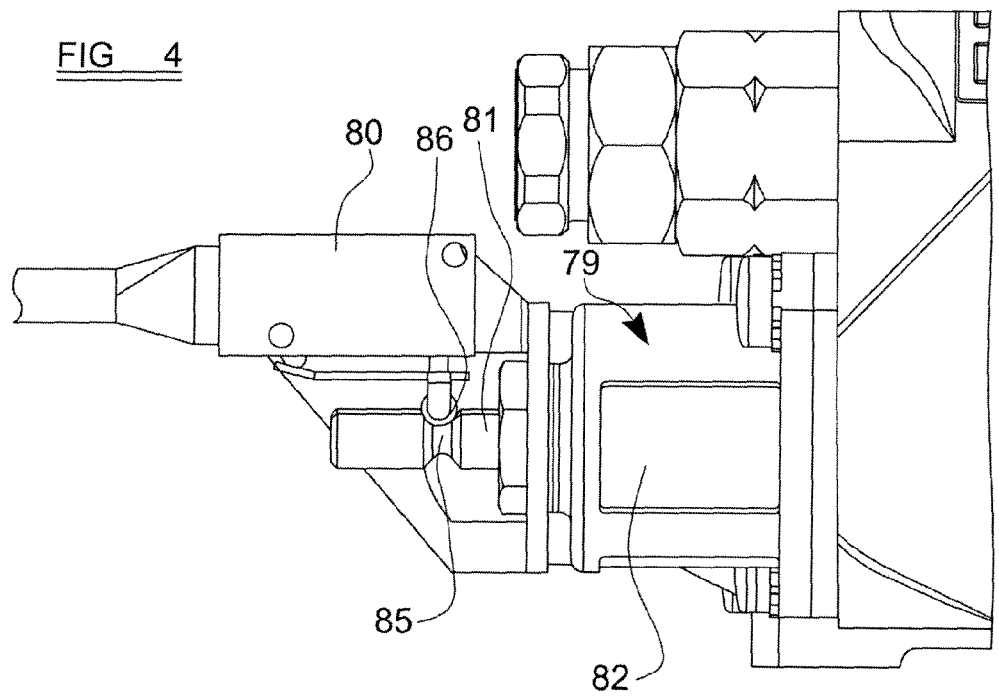

WORKING MACHINE

BACKGROUND TO THE INVENTION

This invention relates to a working machine which includes an axle carrying ground engaging wheels, which is moveable relative to a body of the machine.

More particularly but not exclusively the invention relates to a working machine of the kind which has a working arm which is moveable relative to the body of the machine, the working arm carrying a working implement such as a loading forks or loading or excavating bucket for examples only.

However the invention may be applied to other working machines such as tractors. The axle may be suspended from the body, or may be fixed to pivot about a pivot axis relative to the body.

Such working machines are required to be driven over ground which typically will include many surface irregularities. To facilitate machine travel it is well known to mount one of the axles for pivoting movement relative to the body, about a generally horizontal axis which extends longitudinally of the machine. Such pivoting movement permits the wheels carried by the axle to move in response to ground surface irregularities encountered as the machine travels.

DESCRIPTION OF THE PRIOR ART

Various proposals have been made, for example in U.S. Pat. No. 6,179,304 or U.S. Pat. No. 6,082,742 for controlling the axle pivoting depending upon parameters so as to avoid machine instability conditions arising. Such prior proposals permit the machine to operate in distinct operating modes depending upon the control parameters used. For example such prior proposals may permit the free pivoting of the axle in an axle unlocked mode, or may permit no axle pivoting in an axle locked mode, and may permit restricted axle pivoting in so-called cushioned mode. The machine is caused automatically to change operating mode upon a control parameter changing. Such automatic switching between one operating mode and another can be disconcerting for a machine operator.

SUMMARY OF THE INVENTION

According to one aspect of the present invention we provide a working machine which includes a body and an axle which is mounted so as to be moveable relative to the body, the axle carrying at or towards each end, a ground engaging wheel by means of which the machine is moveable on the ground. The machine may include a speed sensor sensitive to the machine ground speed, and there may be a hydraulic control system including at least one control actuator connected between the body and the axle for controlling movement of the axle relative to the body. The hydraulic system may further include at least one control valve which is operable to restrict fluid flow occurring as a result of the control actuator extending or retracting in response to axle movements relative to the body, by an amount depending upon a machine speed signal provided by the speed sensor. The control valve may be an electrically operated control valve, operated proportionally by a valve controller which responds to changes in machine speed, by adjusting the restriction to fluid flow so as to permit more fluid flow as the machine speed increases.

By virtue of the invention movement of the axle in response to the wheels engaging ground irregularities, is controlled depending on machine speed by restricting the fluid flow e.g. to and/or from the control actuator, and preferably the degree of restriction to fluid flow is continuously varied in response to machine speed variations. Thus there is no switching between operating modes in response to machine ground speed. In one example, the control valve is an electrically operated control valve, operated by a valve controller which responds to changes in machine speed by proportionally or unproportionally, adjusting the restriction to fluid flow.

In one example, above a threshold speed, the control valve may provide substantially no restriction to fluid flow.

Desirably, when the machine is stationary, the controller operates the control valve to prevent fluid flow in the hydraulic system so as to prevent axle movement relative to the body, and the controller operates the control valve to permit more fluid flow as the machine speed increases, at least to the threshold speed at which the control valve may provide substantially no restriction to fluid flow so that the axle may freely move as permitted by its mounting.

However if desired when the machine is stationary, some restricted fluid flow may be permitted upon the controller receiving an auxiliary input from a manual control device, such as for example only, a control lever position sensor, or a switch.

For example, the working machine may include a pair of stabilisers which are both lowered from the body into engagement with the ground at remote positions preferably at either side of the body, to stabilise the machine when performing a working operation, upon an operator manually operating a stabiliser control lever or a switch. As the stabilisers engage with the ground, the ground surface may be at a different level at one side of the body compared to the other. By permitting restricted fluid flow to and/or from the control valve during stabiliser lowering, the stabilisers may engage with the ground whilst the axle may move so that both wheels on the axle may remain in contact with the ground.

In another example the machine may include a further axle which is mounted so as to be moveable relative to the body, the further axle carrying at or towards each end, a ground engaging wheel by means of which the machine travels over the ground. The machine may include a further, sway, actuator connected between the body and the further axle for causing movement of the further axle relative to the body. Such a facility which is known as "sway", is provided to facilitate levelling of the machine body for performing working operations when the machine is stationary.

The sway actuator is operated by a manually operable sway control lever or switch and desirably, when the sway control lever or switch is operated, with the machine stationary, the auxiliary input is provided to the controller which responds by permitting restricted fluid flow.

In a preferred embodiment, the hydraulic system includes a pair of control actuators which include pistons in cylinders, one at or towards either end of the axle, and the control valve controls the flow of fluid from the cylinder at one side of the piston of one of the control actuators, to the cylinder at the one side of the piston of the other of the control actuators. In another example though a single control actuator may be provided with the control valve controlling the flow of fluid from the cylinder at one side of the piston, to the cylinder at the other side of the piston.

The invention has particularly but non-exclusively been developed for a working machine of the kind which includes a loading arm which is pivoted to the body for up and down movement relative to the machine, e.g. at a rear of the body, the loading arm extending beyond a front end of the body and mounting a load handling implement. The loading arm may be telescopically extendible and retractable. The stability of such a machine, particularly when handling loads at great height above and distant from the body of the machine is crucial. The present invention, in which the control valve is operable to prevent or at least maximally restrict fluid flow and hence axle movement, provides for maximum stability during load handling. The control actuator is preferably provided between a rear axle and the body, and the axle with the sway actuator, where provided, is the front axle.

The invention may though be applied to many other working machines which have working arms, such as for examples only, excavating machines, loading machines and machines which are capable for performing both excavating and loading operations, as well as to tractors and the like working machines.

In a preferred embodiment, the axle, movement of which is controlled by the hydraulic system in response to machine ground speed, may be pivotable relative to the body about a substantially horizontal pivot axis which extends longitudinally of the machine.

In another embodiment, the axle may be suspended from the body by suspension control links.

In each case, the other of the axles may be pivoted relative to, or suspended from, the body.

According to a second aspect of the invention we provide a method of operating a working machine which includes a body and an axle which is mounted so as to be moveable relative to the body. The axle may carry at or towards each end, a ground engaging wheel by means of which the machine is moveable on the ground, and the machine may include a speed sensor sensitive to the machine ground speed. A hydraulic control system may be provided which includes at least one control actuator connected between the body and the axle for controlling movement of the axle relative to the body, and the hydraulic system may further include at least one control valve which is operable to restrict fluid flow occurring as a result of the control actuator extending or retracting in response to axle movements relative to the body, the method including restricting fluid flow proportionally depending upon a signal provided by the speed sensor.

According to a third aspect of the invention we provide a method of operating a working machine which includes a body and an axle which is mounted so as to be moveable relative to the body, the axle carrying at or towards each end, a ground engaging wheel by means of which the machine is moveable on the ground. There may be a hydraulic fluid control system including at least one control actuator connected between the body and the axle for controlling movement of the axle relative to the body, and at least one control valve which is operable to at least restrict hydraulic fluid flow in the system occurring as a result of the control actuator extending or retracting in response to axle movements relative to the body. The system may include a controller which provides command signals to the control valve to vary the restriction to fluid flow, depending on a control regime, and the working machine may include an auxiliary hydraulically operated service, and when the auxiliary hydraulically operated service is operated, the restriction to hydraulic fluid otherwise provided by the control valve in accordance with the control regime is at least partially relieved.

In one example, the auxiliary hydraulically operated service is a service for raising and lowering stabilisers of the machine which may stabilise the machine when performing a working operation, in which case when the stabilisers are lowered towards the ground, the restriction to fluid flow in the hydraulic fluid control system may be at least partially relieved. For example, the movement of a part of a stabiliser control structure may operate a device which provides an auxiliary input to the controller. The stabiliser control device may be manually operable upon an operator manually operating a stabiliser control lever or switch.

In another example, additionally or alternatively, the auxiliary service is a service for causing movement of a further axle of the machine relative to the body, the service including a sway actuator connected between the body and the further axle, and the restriction to fluid flow in the hydraulic fluid control system may be at least partially relieved when the sway actuator is operated upon a sway control structure being operated. Movement of a part of a sway control structure may operate a device which provides an auxiliary input to the controller which responds by relieving the flow restriction. The sway control device may be manually operable upon an operator manually operating a sway control lever or switch.

In each case, the control valve may, in the absence of the auxiliary input, be operable to restrict fluid flow in the hydraulic fluid control system occurring as a result of the control actuator extending or retracting in response to axle movements relative to the body, by an amount depending upon a machine speed signal provided by a machine speed sensor. The control valve may thus be an electrically operated control valve, operated proportionally by the controller which responds to changes in machine speed, by adjusting the restriction to fluid flow so as to permit more fluid flow as the machine speed increases.

BRIEF DESCRIPTION OF THE DRAWINGS

Embodiments of the invention will now be described with reference to the accompanying drawings in which:

FIG. 3 is a diagram showing a controller for use in a machine according to the invention;

FIG. 4 is an illustrative diagram showing part of an auxiliary hydraulically operated service of the machine of FIGS. 1 and 2.

DESCRIPTION OF THE PREFERRED EMBODIMENTS

Figure 1:
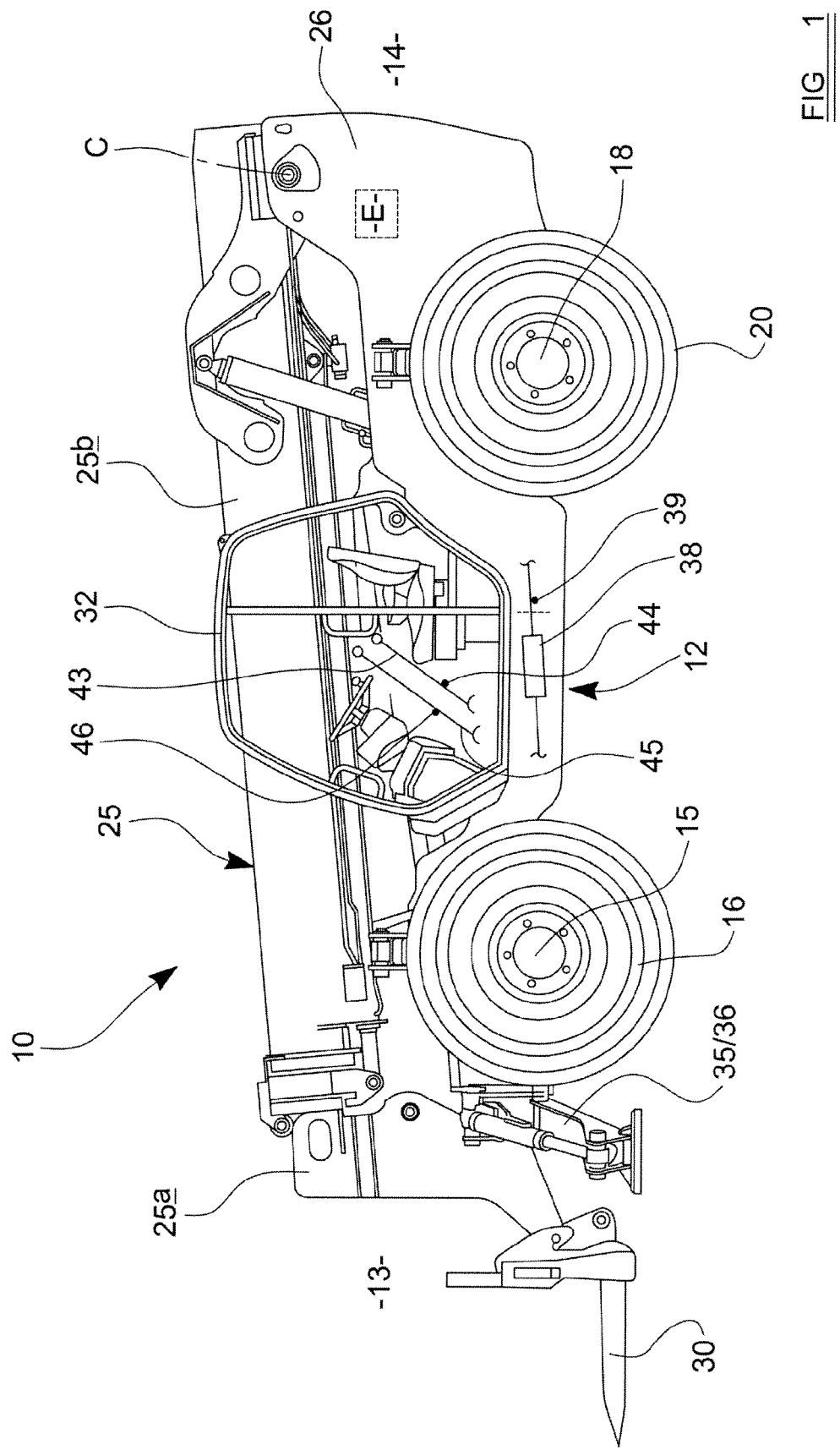
FIG. 1 is a side illustrative view of a working machine in accordance with the present invention.

Referring to the drawings a working machine 10 in this example is a load handling machine, which includes a body 12 having a front end 13 and a rear end 14. Towards a front end of the machine 10 there is a front axle 15 which carries at or near to each end, a front wheel 16, and towards the rear end 14, there is a rear axle 18 which carries at or near each end, a rear wheel 20.

Each of the front 15 and rear 18 axles in this example are pivotally mounted with respect to the body 12 about respective pivot axes A, B. The pivot axes A, B are generally horizontal and extend longitudinally of the machine 10, and in this example are substantially co-axial.

The machine 10 further mounts a loading arm 25 for pivoting up and down movement about a further generally horizontal axis C which is transverse to the pivot axes A, B of the axles 15, 18. The loading arm 25 is mounted on a mounting structure 26 at or toward the rear end 14 of the body 12 and extends forwardly beyond the front end 13 of the body 12.

The loading arm 25 includes a plurality of sections 25a, 25b which are telescopically extendible relative to one another by means of internal hydraulic actuators, and at an outermost end of the loading arm 25, there is a loading implement which in this example is a pair of loading forks 30.

The body 12 carries an operator's cab 32 where an operator sits and controls the machine 10, and in this example, the cab 32 is at one side of the body 12 whilst the loading arm 25 is side mounted at the other side of the body 12 to the cab 32.

An engine E to provide power for the machine 10 is shown mounted towards the rear end 14 of the machine 10, but in another example could be side mounted. The engine E drives the wheels 16, 20 of the machine 10 via a mechanical or hydrostatic or other transmission 38, and a machine ground speed sensor 39 senses movement of part of the transmission 38, such as the rotation of a gear wheel or drive shaft, the speed sensor 39 in use providing an input signal to a controller 40 which is indicative of machine ground speed, which signal is used by the controller 40 to control the operation of a hydraulic system 42 of the machine 10 which will be more particularly described below with reference to FIG. 2. The speed sensor 39 may for example be a Hall effect sensor.

The machine 10 in this example, further includes a pair of stabiliser arms 35, 36 one being provided at each side of the body 12, in this example at the front end 13 of the machine 10. The stabiliser arms 35, 36 are in use, lowered into engagement with the ground to stabilise the machine 10 during working operations as described below, and when not in use are raised into a stowed condition. The stabiliser arms 35, 36 are preferably raised and lowered by an auxiliary hydraulically operated service which includes respective hydraulic actuators.

Within the operator's cab 32 there is provided a manually operated stabiliser arm control lever 43 which when operated causes the stabiliser arms 35, 36 to be raised or lowered, there being in this example a stabiliser control lever movement sensor drive 44 to sense movements of the stabiliser arm control lever 43 from a rest position. Also in the cab 32 there is a manually operable sway control lever 45 the purpose of which will be explained below, and there being a sway control lever movement sensor device 46 to sense movements of the sway control lever 45 from a neutral position.

Each of the stabiliser arm control lever sensor 44 and the sway control lever sensor 46, upon sensing a movement from a neutral position of the respective control lever 43, 45, provides a signal to the controller 40.

Figure 2:
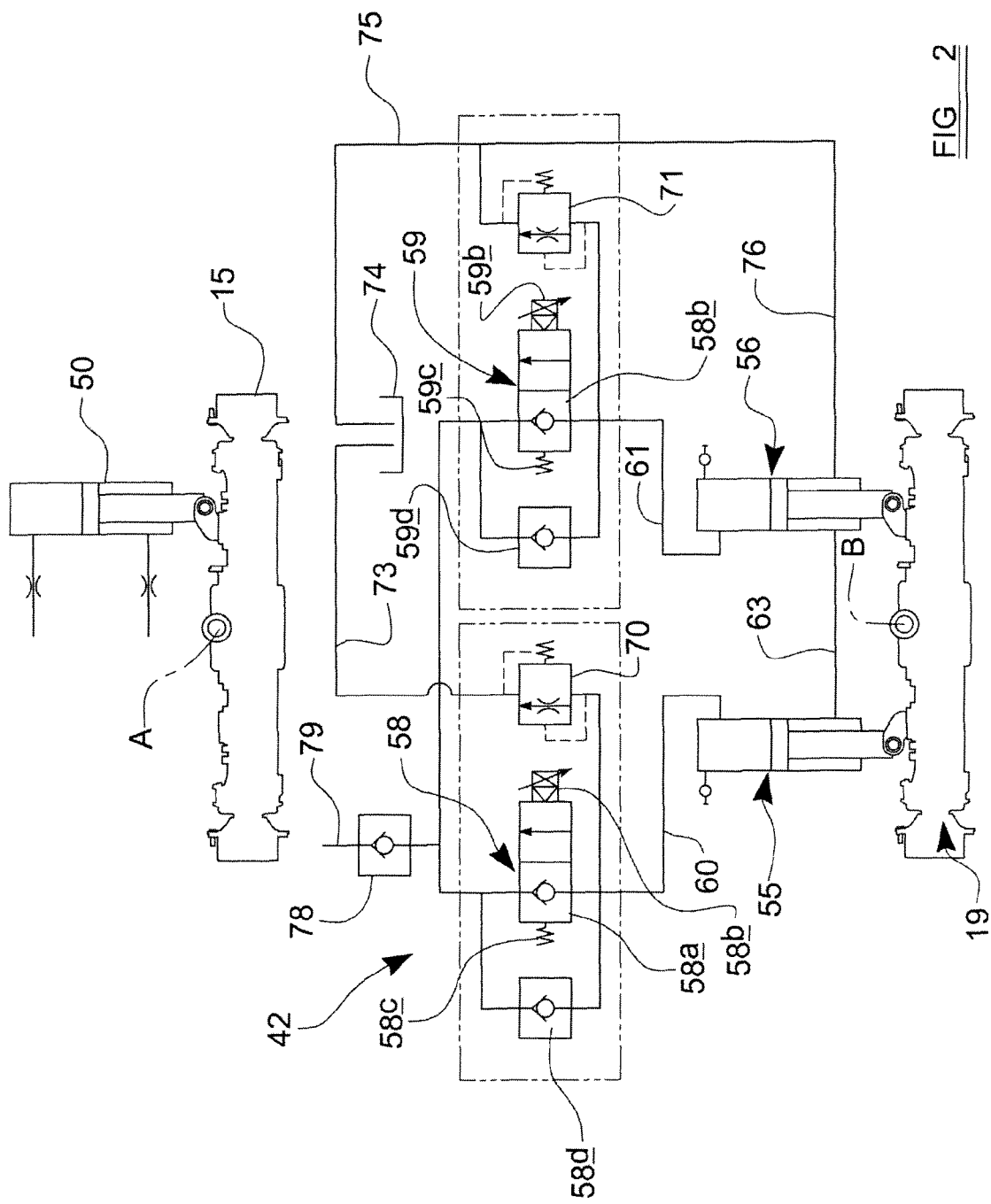
FIG. 2 is an illustrative view of part of the machine of FIG. 1 including a hydraulic circuit thereof.

Referring to FIGS. 2 and 3, between the front axle 15 and the body 12 there is a sway actuator 50 which is in this example a double acting hydraulic actuator of the piston-in-cylinder kind. Under the control of an operator operating the sway control lever 45, the sway actuator 50 may be extended or retracted to pivot the front axle 15 relative to the body 12, to change the attitude of the body 12 relative to the ground. Thus in the event that it is required to perform a working operation and the body 12 of the machine 10 and hence the loading arm 25 is not at a level attitude, the sway actuator 50 may be extended or retracted to level the body 12, to compensate for an unlevelled ground surface.

Other than when being adjusted, the front axle 15 is rigid relative to the body 12, particularly when the machine 10 is travelling over the ground surface.

If desired, the operator's ability to operate the sway may be prevented at other than very slow speeds and when the machine 10 is stationary.

Between the rear axle 18 and the body 12 there are in this example, a pair of control actuators 55, 56, of the hydraulic system, one at each side of the pivot axis B. Each control actuator 55, 56 is again of the piston-in-cylinder kind and may be double acting as drawn or single acting.

The cylinders of the control actuators 55, 56 at the non-annulus sides of the control actuators 55, 56, are interconnected via a hydraulic system 42 which includes a pair of control valves 58, 59, each control valve 58, 58 being provided in a respective hydraulic line 60, 61 which extends to and from the respective control actuators 55, 56.

Each control valve 58, 59 is an electrically operated proportional valve, electrical operation being effected by the controller 40. Each control valve 58, 59 permits the substantially unrestricted flow of hydraulic fluid to the non-annulus side of the respective control actuators 55, 56 via a poppet 58a, 59a, but the flow of fluid from the non-annulus sides of the respective control actuators 55, 56 is controlled depending on the extent of opening of the control valves 58, 59 which depends on a control signal received from the controller 40. The control valves 58, 59 may each have a solenoid or other electrical actuator as shown at 58b, 59b.

Operation of the hydraulic system 42 will now be described.

Upon the rear axle 18 moving in response to ground surface irregularities as the machine 10 travels over the ground, depending on the operating conditions of the control valves 58, 59, pivoting of the rear axle 18 relative to the body 12 may or may not be permitted.

At ground speeds sensed by the machine speed sensor 39 of greater than a threshold speed, for example 4 kph, the controller 40 signals the respective valve solenoids 58b, 59b fully to open the control valves 58, 59 to allow the substantially free flow of fluid through the lines 60, 61. Thus as the machine 10 travels at the threshold speed or higher, the rear axle 18 may pivot about its pivot axis B in response to irregularities in the ground surface as permitted by its mounting, with fluid flowing from one non-annulus control actuator 55, 56 piston side to the non-annulus piston side of the other control actuator 56, 55 depending upon which side of the axle 18 rises and lowers relative to the body 12. Thus the machine body 12 may remain more level than if the rear axle 18 was rigidly mounted, despite ground surface irregularities.

When the machine 10 is stationary or substantially so, the controller 40 will respond to the signal from the speed sensor 39 by signalling the solenoid valves 58, 59 to close, for example by removing any electrical power to the solenoids 58b, 59b altogether, so that the control valves 58, 59 are closed by respective mechanical springs 58c, 59c. Thus fluid will not be permitted to pass from either non-annulus sides of the control actuators 55, 56 to the other and the rear axle 18 will be locked relative to the body 12. Thus when the machine 10 is performing work operations, when stationary, the locked rear axle 18 will afford maximum stability.

At speeds between zero and the threshold speed, the controller 30 responds to the signal from the speed sensor 39 according to e.g. a programmed control regime, by allowing a restricted flow of fluid between the non-annulus sides of the control actuators 55, 56. For example the degree of restriction may be proportional to the machine 10 speed up to the threshold speed. This partial restriction to fluid flow is achieved as the controller 40 provides signals to the solenoids 58b, 59b of the control valves 58, 59 partially to open the valves 58, 59 against the springs 58c, 59c pressures, preferably in proportion to the machine speed signalled by the speed sensor 39.

Thus at speeds up to the threshold speed, some, cushioned, rear axle 18 pivoting is permitted relative to the body 12, the extent of cushioning depending upon machine 10 speed. Thus as machine 10 speed increases from zero, as more accommodation of irregular ground surface conditions is required, the extent of cushioning movement of the rear axle 18 decreases to a minimum as threshold speed is reached.

Because the control valves 55, 56 are proportional valves, there is no sudden change between one discrete operating mode and another, but the degree of change in the amount of cushioning of the rear axle 18 movement as the machine 10 speeds up and slows down, is continuous.

When the machine 10 is stationary for performing working operations, the stabiliser arms 35, 36 may be lowered by a further auxiliary hydraulically operated service. Movement of the stabiliser arm control lever 43 is sensed by the sensor 44 and an auxiliary signal is provided to the controller 40 which responds by relieving the restriction to fluid flow otherwise provided by the control valves 58, 59 in accordance with the control regime. In this example, where the valves 58, 59 are fully closed when the machine 10 is stationary, the controller 40 responds to the auxiliary input from sensor device 44 by partially opening the control valves 58, 59 even though the machine 10 is stationary, the auxiliary input from the stabiliser arm sensor 44 thus overriding. In one example the control valves 58, 59 may be opened to restrict the fluid flow by about 50% as a result of the auxiliary input from sensor 44. Where the control valves 58, 59 are proportional valves, this means that the valves 58, 59 need to be half opened against the forces of the respective closure springs 58c, 59c.

When the stabiliser arms 35, 36 are lowered into engagement with the ground so as to be load bearing, the control lever 43 is released, and this returns under spring control for example to its neutral position, and the controller 40 will again lock-up the rear axle 18 by closing the control 58, 59 valves.

Moreover if it is desired to adjust the level of the front axle 15 by operating the sway actuator 50, when the machine 10 is stationary or slow moving such that in the example, the control valves 58, 59 are fully closed by the control 40 in accordance with the control regime, the sway actuator control lever 45 movement sensor 46 will signal the controller 40. The controller 40 will respond by partially opening the control valves 58, 59, again by for example, 50% to relieve the restriction to fluid flow between the control actuators 55, 56, to permit cushioned rear axle 18 movements. Again, when the sway control lever 45 is released and is returned for example under spring control, to a neutral position, the rear axle 18 will again be locked-out as the control valves 58, 59 close so that fluid cannot pass to and/or from the control actuators 55, 56.

The provision of the auxiliary inputs from sensor devices 44 and 46 to override the control regime otherwise imposed by the controller 40, allows the rear wheels 20 to remain in contact with the ground as the machine 10 is levelled ready for performing working operations, using either or both of the stabiliser arms 35, 36 or the sway control actuator 50. Whereas typically the control valves 58, 59 will be fully closed when the auxiliary input from one or both of the sensor devices 44, 46 is provided, particularly if the machine 10 is still slowly moving over the ground, in the generality, an auxiliary input has the effect of overriding the usual control regime to relieve the restriction to fluid flow which is otherwise imposed.

In the example described, sensor devices 44, 46 have been described as being provided to sense respective movements of parts of respective control structures, namely control lever 43, 45 movements. In another example, illustrated in FIG. 4, movement of another part of the control structure for either the sway actuator 50 or the stabiliser arm actuator(s) may provide the auxiliary input to the controller 40.

In FIG. 4, it can be seen that the control structure for the sway actuator 50 includes a hydraulic control valve 79 of the kind having a spool 81 which moves in a valve housing 82, with an end of the spool 81 extending from the valve housing 82 to an external position. As the spool 81 moves in response to operation of a control such as the control lever 45, or another control, which may be directly connected to the spool 81 or indirectly operationally connected to the spool 81 e.g. via a hydraulic servo or an electrical actuating circuit, the spool 81 will reach a position as shown in FIG. 4.

In FIG. 4 it can be seen that the spool has a groove 85 in the end of the spool 81 external to the valve housing 82, and in the example, the groove 85 is aligned with a detent 76 which may be urged by a resilient device such as a spring, or by gravity, towards the groove 85. If the detent 76 moves out of groove 85, this will cause a signal to the controller 40 to be provided by a signalling device 80 to which the detent 86 is coupled, to indicate that the sway actuator 50 is being operated, thus to provide the auxiliary input to the controller 40 which responds by relieving the restriction to fluid flow between the control actuators 55, 56 which otherwise the control regime would demand.

In yet another example, not illustrated, instead of the operation of the auxiliary hydraulically operated service providing an auxiliary input to the controller 40, at least partially to relieve the restriction to fluid flow between the control actuators 55, 56, operation of the auxiliary service may otherwise at least partially relieve the restriction to fluid flow, by for example a part of a control structure which controls the auxiliary service moving to open a relief valve in a by-pass circuit, or directly acting on the control valves 58, 59, in each case so that the restriction to fluid flow between the control 55, 56 actuators is at least partially relieved.

Further features which are illustrated are as follows.

In the example illustrated, the control actuators 55, 56 are double acting and the annulus sides of the cylinders are interconnected via a flow line 63, so that upon the control actuators 55, 56 being extended and retracted, under the control of the hydraulic system 42, fluid is exchanged between the annulus sides of the control actuators 55, 56. In another example, the control actuators 55, 56 may be single acting.

In the event that the hydraulic fluid in the hydraulic system 42 becomes heated in use and thus expands, to ensure that this does not result in unwanted control actuator 55, 56 extension, there is provided in each hydraulic line 60, 61, a respective one way relief valve 70, 71, which relief valves permit fluid flow between the non-annulus sides of the control actuators 55, 56 and a respective low pressure take-up line 73, 75 which each extend to a reservoir 74 for hydraulic fluid.

The line 75 from the relief valve 71 to the reservoir 74 is also connected via line 76, to each of the annulus sides of the control actuators 55, 56.

Thus under steady state conditions in which the fluid expands, excess fluid may leak from the hydraulic lines 60, 61 in which the control valves 58, 59 are provided, via the respective throttled thermal relief valves 70, 71 to the supply and take-up lines 73, 75.

In the event of any loss of volume of hydraulic fluid from the hydraulic system 42 due to leakage or shrinkage, which could result in unwanted control actuator 55, 56 movements, fluid may pass from a pressured supply 79, via a one way valve 78 into the hydraulic lines 60, 61 in which the control valves 58, 59 are provided. If the control valves 58, 59 are closed, the fluid may pass into the lines 60, 61 between the valves 58, 59 and control actuators 55, 56 via check valves 58d, 59d.

Various modifications may be made without departing from the scope of the invention.

For example, although in the example described, a pair of control actuators 55, 56 are provided, one for each side of the rear axle 18, in another embodiment a single control actuator may be provided at one side of the pivot axis B, with fluid flow between the cylinder at one side of the piston and the cylinder at the other side of the piston being controlled by one or more control valves.

In another example, where there are two control actuators 55, 56 as illustrated, instead of each control actuator 55, 56 having in the respective hydraulic line 60, 61 its own control valve 58, 59, in another example, fluid flow between the control actuators 55, 56 or between the one cylinder side and the other where a single control actuator is provided, may be controlled by a single control valve.

In the example described, lowering or raising of the stabiliser arms 35, 36 is achieved with a manually operable control device being a control lever 43, but this may be achieved with a switch which not only provides for stabiliser movement but also for providing an auxiliary input indicative of stabiliser arm 35, 36 actuator, to the controller 40 such that a separate sensor as shown at 44 need not be required.

A switch may be provided instead of the sway control lever 45 also so that again, a separate sway control movement sensor as indicated at 46 need not be provided.

Although the invention has been described in relation to a loading machine 10, the invention is applicable to a multitude of different working machines. With alternative geometry loading machines and/or other alternative working machines, instead of the rear axle 18 being stabilised as described above, the front axle 15 and/or front and rear axles 15, 18, may be stabilised in the manner described for rear axle 18 in the example.

In a modified embodiment, if desired other inputs may be provided to the controller 40 which affect the operation of the hydraulic system 42. For example, the controller 40 may not open the control valves 58, 59 in response to the signal from the speed sensor 39 in the event that a parking brake is operational, but subject to either auxiliary input or inputs which indicate stabiliser arm 35, 36 lower or raising, or sway actuator 50 operation.

Of course, if desired, no sway facility or stabilizer arms, need to be provided. An auxiliary signal to the controller 40 to at least partially relieve restriction to fluid flow otherwise provided, may be derived from any appropriate auxiliary service, as desired.

In another embodiment, the rear axle 18, or at least the axle movement of which is to be controlled by the hydraulic system 42, need not be pivoted relative to the body 12 as described, but the axle 18 may be suspended from the body 12 by suspension control links which permit up and down axle 18 movements relative to the body 12, differentially at either side of the machine 10.

Dampers such as mechanical or gas springs, would be required to damp axle movements.

However, the hydraulic system 42 described may still control axle movements relative to the body 12 in substantially the same way as described for pivoted axle 18 of the illustrated embodiment.

In each case of pivoted or suspended axle 18, the other axle, e.g. front axle 15, may be pivoted too, as described with reference to FIG. 2, or suspended from, the body 12 as required although in the case of a suspended axle 15, 18, two control actuators 50; 55, 56, one at or towards each of the respective axle ends, would be required.

Although in each example described above, the hydraulic system 42 is only operational to restrict fluid flow so as to prevent free axle movement as permitted by its mounting, below a threshold speed, in another example, in which the amount of fluid flow restriction may or may not be proportional to the machine 10 ground speed, the hydraulic system 42 may provide resistance to fluid flow by an amount depending on machine ground speed, over the entire machine ground speed range.

The invention claimed is:

1. A working machine which includes a body and an axle which is mounted so as to be moveable relative to the body, the axle carrying at or towards each end, a ground engaging wheel by means of which the machine is moveable on the ground, the machine including a speed sensor sensitive to the machine ground speed, and there being a hydraulic control system including at least one control actuator connected between the body and the axle for controlling movement of the axle relative to the body, and the hydraulic system further including at least one control valve which is operable to restrict fluid flow occurring as a result of the control actuator extending or retracting in response to axle movements relative to the body, by an amount depending upon a machine speed signal provided by the speed sensor wherein the control valve is an electrically operated control valve, operated proportionally by a valve controller which responds to changes in machine speed, by adjusting the restriction to fluid flow so as to permit more fluid flow as the machine speed increases.

2. A machine according to claim 1 wherein the degree of restriction to fluid flow is continuously varied in response to machine speed variations.

3. A machine according to claim 1 wherein above a threshold speed, the control valve provides substantially no restriction of fluid flow.

4. A machine according to claim 1 wherein the control valve is an electrically operated control valve, operated by a valve controller which responds to changes in machine speed, by adjusting the restriction to fluid flow.

5. A machine according to claim 4 wherein when the machine is stationary, the controller operates the control valve to prevent fluid flow in the hydraulic system, and the controller operates the control valve proportionally to permit more fluid flow as the machine speed increases.

6. A machine according to claim 5 wherein the controller operates the control valve proportionally to permit more fluid flow as the machine speed increases from stationary, to a threshold speed at which the control valve provides substantially no restriction to fluid flow.

7. A machine according to claim 6 wherein the working machine includes a pair of stabiliser arms which are both lowered from the body into engagement with the ground, and upon an operator manually operating a manual control device to lower the arms, the auxiliary input to the controller is generated.

8. A machine according to claim 6 wherein the machine includes a further axle which is mounted so as to be moveable relative to the body, the further axle carrying at or towards each end, a ground engaging wheel by means of which the machine travels over the ground, the machine including a further, sway, actuator connected between the body and the further axle for causing movement of the further axle relative to the body, the sway actuator being operated by a manual control device to generate the auxiliary input.

9. A machine according to claim 5 wherein when the machine is stationary, some restricted fluid flow is permitted upon the controller receiving an auxiliary input from a manual control device.

10. A machine according to claim 9 wherein the manual control device is one of a control lever and a switch.

11. A machine according to claim 1 wherein the hydraulic system includes a pair of control actuators which include pistons in cylinders, one at or towards either end of the axle, and the control valve controls the flow of fluid from the cylinder at one side of the piston of one of the control actuators, to the cylinder at the one side of the piston of the other of the control actuators in response to axle movements.

12. A machine according to claim 1 which includes a loading arm which is pivoted to the body for up and down movement relative to the body at a rear end of the machine, and the loading arm extends beyond a front end of the machine and mounts a load handling implement.

13. A machine according to claim 12 wherein the loading arm is telescopically extendible and retractable.

14. A machine according to claim 12 wherein the control actuator is provided between a rear axle and the body.

15. A machine according to claim 12 wherein, the machine includes a further axle which is mounted so as to be moveable relative to the body, the further axle carrying at or towards each end, a ground engaging wheel by means of which the machine travels over the ground, the machine including a further, sway, actuator connected between the body and the further axle for causing movement of the further axle relative to the body, the sway actuator being operated by a manual control device to generate the auxiliary input and wherein the axle with the sway actuator is the front axle.

16. A method of operating a working machine which includes a body and an axle which is mounted so as to be moveable relative to the body, the axle carrying at or towards each end, a ground engaging wheel by means of which the machine is moveable on the ground, the machine including a speed sensor sensitive to the machine ground speed, and there being a hydraulic control system including at least one control actuator connected between the body and the axle for controlling movement of the axle relative to the body, and the hydraulic system further including at least one control valve which is operable to restrict fluid flow occurring as a result of the control actuator extending or retracting in response to axle movements relative to the body, the method including restricting fluid flow proportionally depending upon a signal provided by the speed sensor.

17. A method of operating a working machine which includes a body and an axle which is mounted so as to be moveable relative to the body, the axle carrying at or towards each end, a ground engaging wheel by means of which the machine is moveable on the ground, and there being a hydraulic fluid control system including at least one control actuator connected between the body and the axle for controlling movement of the axle relative to the body, and at least one control valve which is operable to at least restrict hydraulic fluid flow in the system occurring as a result of the control actuator extending or retracting in response to axle movements relative to the body, and a controller which provides command signals to the control valve to vary the restriction to fluid flow, depending on a control regime, and the working machine including an auxiliary hydraulically operated service, and when the auxiliary hydraulically operated service is operated, the restriction to hydraulic fluid otherwise provided by the control valve in accordance with the control regime is at least partially relieved.

18. A method according to claim 17 wherein the auxiliary hydraulically operated service is a service for raising and lowering stabilisers of the machine which may stabilise the machine when performing a working operation, and when the stabilisers are lowered towards the ground, the restriction to fluid flow in the hydraulic fluid control system is at least partially relieved.

19. A method according to claim 18 wherein the movement of a part of a stabiliser control structure operates a device which provides an auxiliary input to the controller.

20. A method according to claim 19 wherein the stabiliser control device is manually operable upon an operator manually operating a stabiliser control lever or switch.

21. A method according to claim 18 wherein the auxiliary service is a service for causing movement of a further axle of the machine relative to the body, the service including a sway actuator connected between the body and the further axle, and the restriction to fluid flow in the hydraulic fluid control system being at least partially relieved when the sway actuator is operated upon a sway control structure being operated.

22. A method according to claim 21 wherein movement of a part of a sway control structure operates a device which provides an auxiliary input to the controller which responds by relieving the flow restriction.

23. A method according to claim 22 wherein the sway control device is manually operable upon an operator manually operating a sway control lever or switch.

24. A method according to claim 18 wherein the control valve is, in the absence of the auxiliary input, operable to restrict fluid flow in the hydraulic fluid control system occurring as a result of the control actuator extending or retracting in response to axle movements relative to the body, by an amount depending upon a machine speed signal provided by a machine speed sensor.

25. A method according to claim 24 wherein the control valve is an electrically operated control valve, operated proportionally by the controller which responds to changes in machine speed, by adjusting the restriction to fluid flow so as to permit more fluid flow as the machine speed increases.

* * * * *